United States Patent [19]

Akasaki et al.

[11] 4,325,070
[45] Apr. 13, 1982

[54] RECORDING HEAD FOR FACSIMILE RECEIVERS

[75] Inventors: Isamu Akasaki; Masaaki Ohsima; Nobuhide Matsuda; Michio Matsuki, all of Kawasaki; Yoshio Tsukamoto, Tokyo; Hiromichi Kagi, Tokyo; Hidehalu Fukazawa, Tokyo, all of Japan

[73] Assignees: Matsushita Electric Ind. Co., Ltd.; Matsushita Graphic Communication Systems, Inc., both of Tokyo, Japan

[21] Appl. No.: 90,685

[22] Filed: Nov. 2, 1979

[30] Foreign Application Priority Data

Nov. 7, 1978 [JP] Japan ................................ 53-137570

[51] Int. Cl.³ .............................................. G01D 9/42
[52] U.S. Cl. .................................................... 346/108
[58] Field of Search ............... 346/76 PH, 108, 76 L, 346/107 R; 358/302

[56] References Cited

U.S. PATENT DOCUMENTS

| | | | |
|---|---|---|---|
| 3,689,932 | 9/1972 | Gerber | 358/302 X |
| 3,952,311 | 4/1976 | Lapeyre | 346/107 R |
| 4,070,680 | 1/1978 | Shelley | 346/76 PH |
| 4,178,615 | 12/1979 | Shimooka et al. | 358/302 |

FOREIGN PATENT DOCUMENTS

| | | | |
|---|---|---|---|
| 50-5535 | 3/1975 | Japan | 346/76 PH |
| 786024 | 11/1957 | United Kingdom | 346/76 PH |

*Primary Examiner*—George H. Miller, Jr.
*Attorney, Agent, or Firm*—Lowe, King, Price & Becker

[57] ABSTRACT

A recording head for use in a facsimile communication system comprises a plurality of recording elements each having an effective recording area surrounded by an ineffective area. The recording elements are arranged on a plane in a step-like configuration in which the elements are displaced both longitudinally and transversely with respect to another such that there is a spacing between the effective areas of the recording elements in the longitudinal direction and there is no spacing between them in the transverse direction. The recording head is so oriented that the longitudinal direction corresponds to the direction of line scan.

1 Claim, 4 Drawing Figures

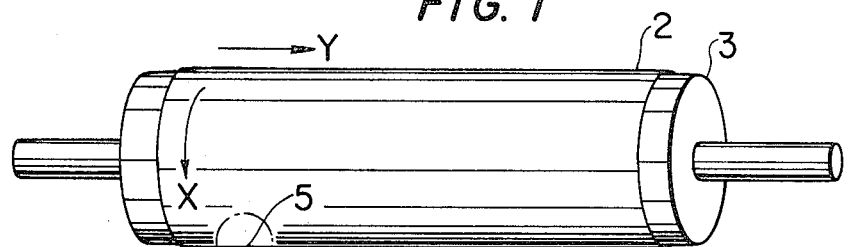
FIG. 1
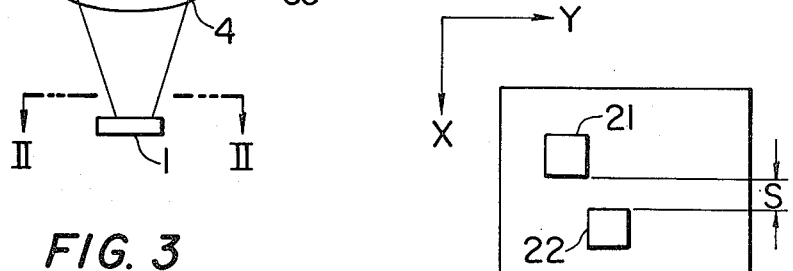
FIG. 2
FIG. 3
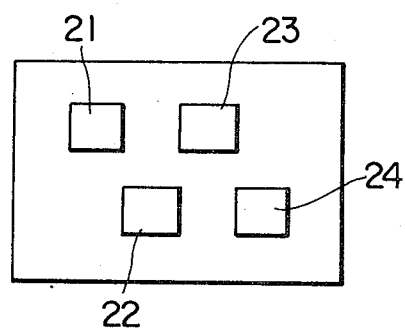
FIG. 4
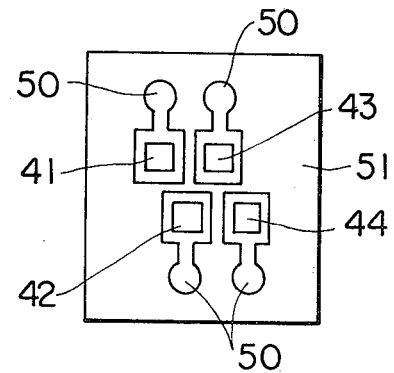

RECORDING HEAD FOR FACSIMILE RECEIVERS

BACKGROUND OF THE INVENTION

The present invention relates generally to facsimile communications, and more specifically to a recording head for use in the facsimile communication system.

Because of its capability to transmit any type of information, either typographic or diagrammatic, facsimile communication systems are finding extensive use in various business activities. Since the facsimile signals are usually transmitted over the public telephone network, the transmission time is of a particular concern to the facsimile user, and various attempts have hitherto been made to reduce the transmission time. This transmission time is largely determined by the highest speed available at the receiving end of the line to convert the received information into a visual image. Photoelectrical methods permit high speed signal-to-image conversion and because of this the conventional system employs a laser beam which is modulated in intensity to form a picture element on a photographic recording medium. Although the speed with which the image is reproduced could be further increased by improving the performance of the beam source and/or the recording medium, there is a limit in speed performance to such systems using a single laser source.

SUMMARY OF THE INVENTION

A primary object of the present invention is to increase the recording speed of a facsimile communication system by the use of a plurality of recording elements, such as light sources, to simultaneously scan along plural lines. The recording time of the system is thus reduced to 1/n (where n is the number of such recording elements) of the time available with a single recording element.

However, due to the fact that the usable, effective surface area of the recording element is surrounded substantially by an ineffective surface area such as electrodes, it is impossible to arrange them along a single row with no spacing between them.

The present invention eliminates this difficulty by arranging plural recording elements on a single mounting plate in a step-like configuration in which the elements are longitudinally and transversely displaced with respect to one another such that there is a spacing between the effective surface areas in the longitudinal direction to accommodate the ineffective areas, while there is no spacing between the effective areas in the transverse direction. The mounting plate is so oriented with respect to the surface of a recording medium that the longitudinal direction corresponds to the direction of line scan.

BRIEF DESCRIPTION OF THE DRAWINGS

The invention will be further described by way of example with reference to the accompanying drawings, in which:

FIG. 1 is a schematic illustration of a recording head of the invention positioned with respect to a rotating drum;

FIG. 2 is a plan view of the recording head seen in the direction indicated by the arrows II of FIG. 1;

FIG. 3 is an alternative embodiment of FIG. 2; and

FIG. 4 is a view showing the detail of the arrangement of FIG. 3.

DETAILED DESCRIPTION

In FIG. 1, a recording head 1 of the invention is shown positioned with respect to the surface of a recording medium or sheet 2 which is rolled up on a drum 3 rotating in the direction as indicated by the arrow A by a suitable means (not shown). For purposes of disclosure the recording head 1 comprises a plurality of light-emitting diodes, separately shown in FIGS. 2 to 4 to emit beams of light through a lens 4 to form a focus on the surface of the recording sheet 2 as at point 5. The recording head receives video signals of separate scanning lines from the transmitter of a facsimile system to form a plurality of picture elements on the sheet 2 which is rotating in the direction indicated by the arrow X to scan plural lines, and is moved in the direction indicated by the arrow Y with respect to the drum by a suitable drive means (not shown) to successively shift the scan lines until the whole area of the recording sheet 2 is scanned.

In accordance with the invention, the recording head 1 comprises a set of four light emitting diodes of which the effective light emitting areas are represented by squares 21, 22, 23 and 24, as shown in FIG. 2. The light emitting areas are arranged in a step-like configuration in which each light-emitting diode is located behind and displaced to the right of the preceding one. More specifically, the light-emitting areas 21 to 24 are closely spaced apart in the Y direction so that an edge of each area is in alignment with an adjacent edge of the preceding one, or may be partially overlapped with each other, while in the X direction a spacing S is provided between adjacent light emitting areas. When the diodes are activated simultaneously in response to respective video signals, the rotation of the drum 3 in the X direction results in a continuous run of successive image elements on the recording surface along closely spaced-apart scan lines 31, 32, 33 and 34 in a single scanning cycle, as shown in a circle 6 of FIG. 1. The recording head 1 is successively moved in the Y direction in subsequent scan cycles by the width of four lines until the last scan is reached. Therefore, the recording surface is scanned at a speed four times higher than for a system using a single light emitting source for each line scan.

An alternative arrangement of the light-emitting areas is shown in FIG. 3 in which the light emitting areas 23 and 24 are in line with the areas 21 and 22 respectively in the Y direction, with the areas 22 and 24 being located behind the preceding ones 21 and 23, respectively, and slightly to the right as in the arrangement of FIG. 2.

FIG. 4 is an illustration of the recording head 1 of FIG. 3 in a greater detail. The recording head comprises a GaAsP monolithic substrate on which are provided diffused areas 41 to 44 and an electrode 50 that surrounds the periphery of each diffused area to excite it in response to an input signal applied thereto for emission of light. The electrodes 50 are spaced apart in both X and Y directions, but the light-emitting areas 41 to 44 are arranged in a similar manner to that shown in FIG. 3.

It is to be noted that the invention is not to be limited to the use of a plurality of light emitting diodes. The invention can also be applied to a facsimile receiver in which the image is recorded on a thermally sensitive medium using a heating element. In this case, heating elements having square-shaped contact areas are arranged in the same fashion as illustrated in FIG. 2 or 3.

The use of light-emitting diodes or heating elements as image recording elements has resulted in the elimination of an aperture which is conventionally employed in forming a rectangular section laser beam.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A recording head for use in a facsimile communication system having a recording medium on which an image is produced in response to said recording head upon activation and means for moving said recording head relative to the surface of said recording medium in a first direction to scan along each of a plurality of lines across said medium and in succession between the lines in a second direction perpendicular to said first direction, comprising a plurality of light emitting diodes arranged in first and second rows, said diodes being spaced apart from each other in said first direction, each of said diodes having a quadralateral light emitting area and an electrode surrounding said quadralateral area, the electrode of each of said light emitting diodes being spaced apart from the electrodes of adjacent light emitting diodes, the light emitting areas of the diodes of said second row being offset from each other by a distance equal to the length of a side of each light emitting area in said second direction and staggered in position relative to those of the light emitting areas of the diodes of said first row so that edges of said light emitting areas of said first row are aligned in said first direction with edges of said light emitting areas of said second row.

* * * * *